United States Patent [19]

Fujiwara et al.

[11] Patent Number: 4,752,909
[45] Date of Patent: Jun. 21, 1988

[54] SEQUENCE CONTROLLER

[75] Inventors: Tatsuo Fujiwara, Nakajomachi; Ryouichi Abe; Naohiro Kurokawa, both of Shibatashi, all of Japan

[73] Assignee: Hitachi, Ltd., Tokyo, Japan

[21] Appl. No.: 743,148

[22] Filed: Jun. 10, 1985

[30] Foreign Application Priority Data

Jun. 22, 1984 [JP] Japan .................................. 59-127426

[51] Int. Cl.⁴ ............................................. G06F 15/46
[52] U.S. Cl. ..................................................... 364/900
[58] Field of Search ... 364/200 MS File, 900 MS File, 364/140–147

[56] References Cited

U.S. PATENT DOCUMENTS

| 4,178,634 | 12/1979 | Bartlett | 364/900 |
| 4,249,248 | 2/1981 | Yomogida et al. | 364/900 |
| 4,316,260 | 2/1982 | Hideshima et al. | 364/900 |

FOREIGN PATENT DOCUMENTS 2399691 3/1979 France .

OTHER PUBLICATIONS

Patent Abstracts of Japan, vol. 8, No. 86 (P-269)[1523], Apr. 19, 1984 (Masaya Murata).

Primary Examiner—Archie E. Williams, Jr.
Assistant Examiner—Michael J. Ure
Attorney, Agent, or Firm—Fay, Sharpe, Beall, Fagan, Minnich & McKee

[57] ABSTRACT

In a sequence controller, a sequence program store device includes an instruction store unit for writing a specific instruction dedicated to the sequential control and a plurality of latch circuits respectively associated with the outputs from an output unit. The latch circuits are controlled by a signal from a processing device which periodically calls and processes the program from the store device and executes a specific output processing when external input signals satisfy a logical state set by the program; the latch circuits, if a transition condition of the program is satisfied when the specific instruction is processed, retain an output state of the output unit until the next transition condition is satisfied, and release the state retaining the output state before the next transition condition is satisfied.

13 Claims, 5 Drawing Sheets

| STEP | INSTRUCTION | TRANSITION CONDITION DATA | OUTPUT |
|------|-------------|------|--------|
| 00 | AND | 00 | |
| 01 | AND | 01 | 50 |
| 02 | AND | 02 | 51 |
| 03 | AND | 03 | 52 |
| 04 | AND | 04 | 53 |
| 05 | JMP | | |

FIG. 10
PRIOR ART

SEQUENCE CONTROLLER

BACKGROUND OF THE INVENTION

The present invention relates to a stored program sequence controller, and in particular, to a sequence controller suitable for controlling a system processing both the conditional and sequential control.

In the prior-art stored program sequence controller, there have been mainly utilized two kinds of instruction processing procedures. The first is called a conditional control procedure in which external input signals are scanned for each cycle of a sequence program, and a specific output processing is carried out when the external input signals scanned satisfy a logical condition set by the program, whereas the output processing is skipped and control proceeds to the next step if the condition is not satisfied. This cyclic processing is thus suitable for a conditional control including a complicated random logic.

The second of the procedures is named a sequential control procedure in which a specific output state is retained until a step is completed and control is transferred to the subsequent step when the preceding step is finished, thereby performing a stepwise operation.

That is, the sequential control is utilized to execute step by step a processing based on a signal which confirms a completion of the preceding step.

Since the sequence controller which operates according to the sequential control primarily monitors the transition condition for passing control from a step to another step throughout its operation and an interlock between steps is not thus required, a program can be advantageously constructed simply in accordance with the operation flow of the sequence controller; however, a parallel processing cannot be easily implemented, and there have been difficulties, for example, a special external circuit is necessary to detect an emergency stop condition when executing an interrupt processing for an emergency stop.

On the other hand, although the sequential control can be implemented by the sequence controller operating in accordance with the conditional control procedure, since the output section is set to and remains in the output state only while it is receiving output information from the CPU in the conventional sequence controller system configuration, if the sequence controller is applied to the sequential control, it is necessary to provide a function to keep the output state by its internal processing so as to retain the output state until the transition condition is satisfied as described above. To this end, an interlock between two steps needs to be established in accordance with an internal output, which leads to a disadvantage that the program becomes more complex.

SUMMARY OF THE INVENTION

It is therefore an object of the present invention to provide a sequence controller which can be utilized both for the conditional control and sequential control and which facilitates the programming without requiring a complicated interlock between steps when applied to the sequential control.

In accordance with the present invention, there is provided a sequence controller comprising: a sequence program store section; a logical judge section for periodically calling and processing a program from said store section and for executing specific output processing when external input signals satisfy a logical state set by the program; instruction store means for storing a specific instruction dedicated to a sequential control in said store section; and a plurality of latch circuits respectively associated with the outputs from said output section; said latch circuits being controlled by a signal from said logical judge section, retaining an output state of said output section associated therewith until the next transition condition is satisfied in accordance with satisfaction of the transition condition of the program when said logical judge section processes the specific instruction, and releasing the state retaining the preceding output state before the next transition state is satisfied.

According to the present invention, when executing a sequential control by use of a sequence controller operating in accordance with the conditional control procedure, the latch circuits are operated when a transition condition of the program is satisfied while processing a specific instruction stored in the sequence program store section, and the output state of the output section is retained in the latch circuits until the next transition condition is satisfied; consequently, the program can be simply constructed without a complicated interlock between steps, and a parallel processing as well as an interrupt processing for an emergency stop can be easily implemented because the sequence controller performs a cyclic processing.

DESCRIPTION OF THE PREFERRED EMBODIMENT

Figure 5:
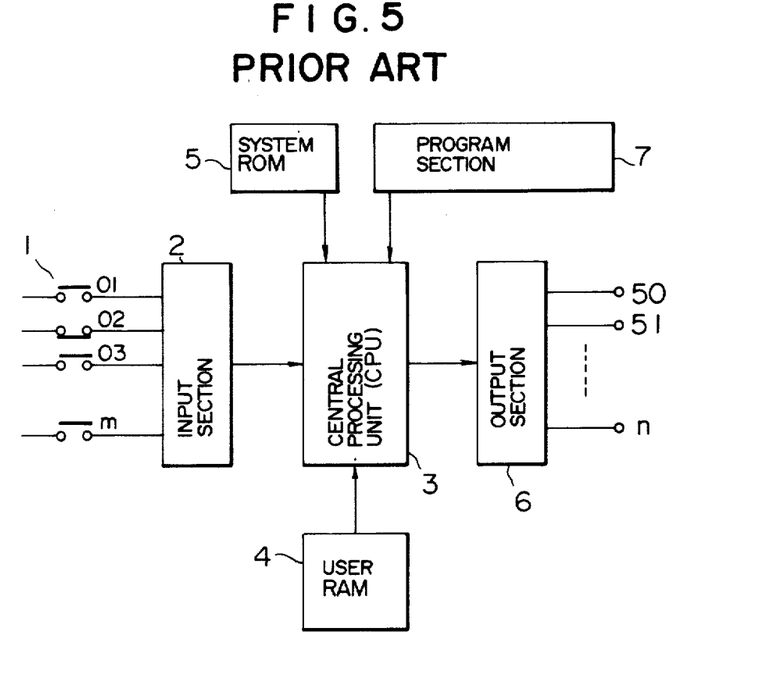
FIG. 5 is a schematic system configuration block diagram of the prior art sequence controller.

Referring to FIG. 5, there is shown a schematic system configuration of the prior art stored program sequence controller. This system comprises a group of contact points 1 utilized as an external input signal source, an input section 2 for receiving external input signals from the contact point group 1, a central processing unit (referred to as CPU hereinafter) 3 forming a logical judge section, a user RAM 4 for storing a sequence program, system ROM 5 for storing a sequence program processing procedure and a program procedure, an output section 6 for outputting a result of an output processing of the CPU 3 to an external device, and a program section 7 utilized as instruction store means for storing sequence instructions as a program in the user RAM 4. The CPU 3 sequentially calls the sequence program from the user RAM 4 to determine whether or not the input signals 00, 01, . . . , m obtained via the input section 2 satisfy a logical state set by the program, then outputs the result of the output processing to an external device as outputs 50, 51, . . . , n from the output section 6.

Figure 6:
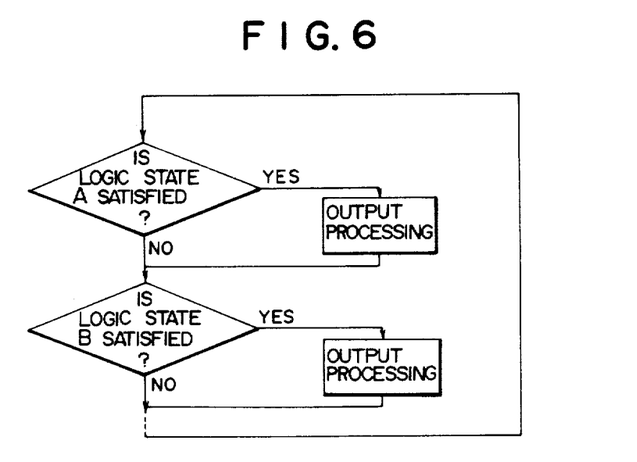
FIG. 6 is a flowchart illustrating a procedure for processing the conditional control.

In the sequence controller, these are mainly utilized two types of instruction processing procedures. The first is called a conditional control procedure in which external input signals are scanned for each cycle of a sequence program as generally shown in FIG. 6, and a specific output processing is carried out when the external input signals scanned satisfy a logical condition set by the program, whereas the output processing is skipped and control proceeds to the next step if the condition is not satisfied. This cyclic processing is thus suitable for a conditional control including a complicated random logic.

Figure 7:
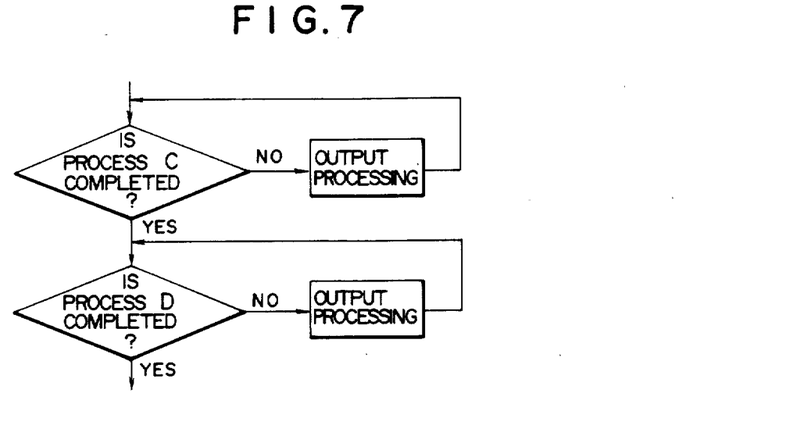
FIG. 7 is a flowchart depicting a procedure for processing the sequential control.

The second is named a sequential control procedure in which a specific output state is retained until a step is completed as generally shown in FIG. 7, and control is transferred to the subsequent step when the preceding step is finished, thereby performing a stepwise processing.

Referring now to the flowchart of FIG. 8, a concrete example of sequential control will be described. When an input signal 00 is turned on, control is passed from step a representing the initial state to step b so as to set an output 50 to ON. If an input signal 01 is turned on, step b proceeds to step c to set an output 51 to ON, that is, the subsequent step is executed in response to a signal confirming the completion of the preceding step. The sequence controller operating in accordance with the sequential control procedure is suitable for this control described above, which can be easily implemented by the sequence program of FIG. 9.

This provision advantageously avoids the necessity of an interlock between steps and thus allows the program to be simply constructed in accordance with the operation flow. In the sequence controller utilizing the sequential control procedure, however, only the transition condition for shifting control from a step to another step is primarily monitored; consequently, a parallel processing cannot be easily accomplished, and there exist disadvantages, for example, a special external circuit for detecting an emergency stop condition is necessary for an interrupt processing of an emergency stop.

Figure 8:
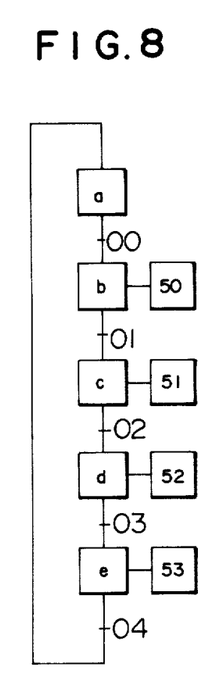
FIG. 8 is an operation flowchart showing the sequential control.
Figure 9:
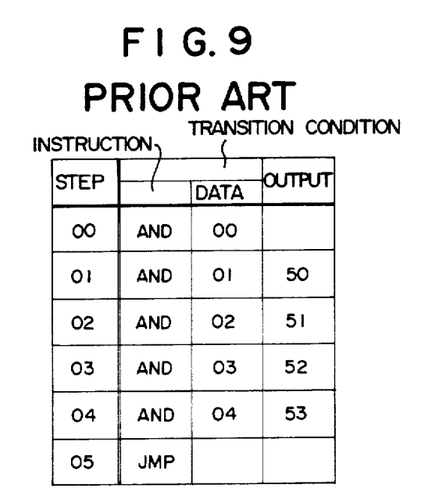
FIG. 9 is a program table illustrating a program example in a sequence controller operating in accordance with the sequential control.

On the other hand, the operation flow of the sequential control as depicted in FIG. 8 can be implemented by the sequence controller operating in accordance with the conditional control procedure. The sequence program thereof is shown as a ladder diagram in FIG. 10.

Figure 10:
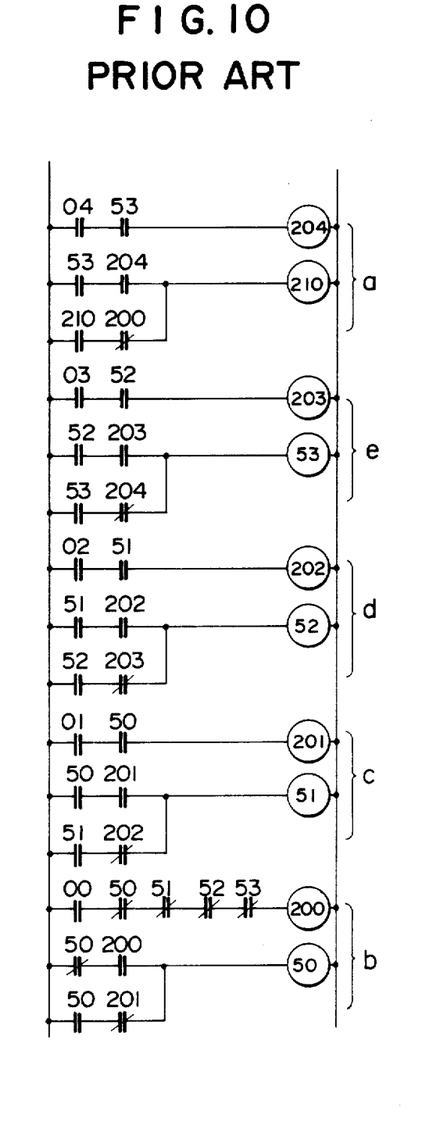
FIG. 10 is a ladder diagram depicting a program example in a sequence controller operating in accordance with the conditional control.

In the conditional control procedure, the system performs a cyclic processing, and hence the parallel processing and the interrupt processing for an emergency stop can be easily achieved. However, in the system configuration of the prior art sequence controller illustrated in FIG. 5, since the output section 6 is set to and remains in the output state only while receiving output information from the CPU 3, it is necessary to provide a function for keeping its own state by an internal processing in order to retain the output state until the transition condition is satisfied; as a result, such interlocks between steps as implemented by internal outputs 200-210 of FIG. 10 are required, which leads to a disadvantage that the program becames more complicated.

In order to overcome above-mentioned difficulties, the present invention provides a sequence controller which can be utilized both for the conditional control and sequential control and which facilitates the programming without requiring a complicated interlock between steps when applied to the sequential control.

Referring to FIGS. 1 to 4, an embodiment of the present invention will be described.

Figure 1:
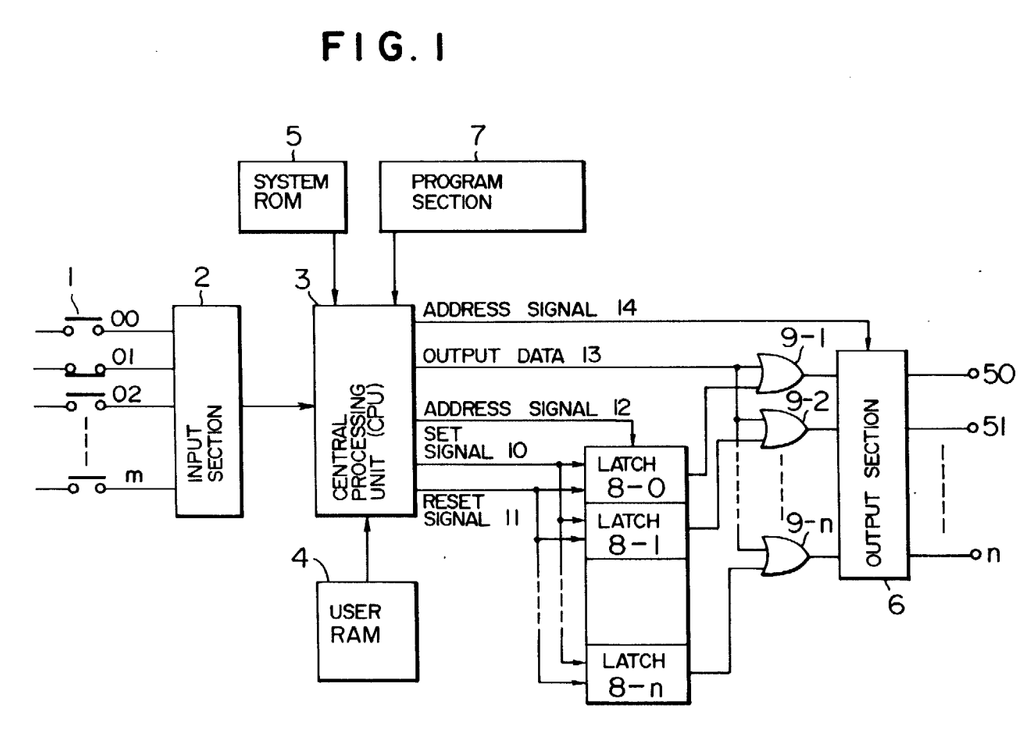
FIG. 1 is a schematic circuit block diagram illustrating an embodiment of the present invention.

FIG. 1 is a schematic system configuration of the embodiment comprising the basic configuration idential to that shown in FIG. 5, which includes the input section 2 connected to the group of contact points 1 utilized as an external input signal source, the CPU 3 as processing means, a user RAM 4 as sequence program storing means, the system ROM 5 in which the sequence program processing procedure and the program procedure are stored, the output section 6 which is for outputting a result of an output processing of the CPU 3 to an external device, and the program section 7 utilized as instruction store means; wherein the CPU 3 periodically calls and processes a program from the user RAM 4 in accordance with the processing procedure stored in the system ROM 5 so as to execute a specific output processing when the external input signals fetched through the input section 2 satisfy the logical state set by the program. That is, the instructions are processed cyclically in the same manner as is utilized in the prior art sequence controller operating in accordance with the conditional control procedure.

The embodiment is different from the prior art sequence controller in that the sequential control can be easily accomplished through cyclic processing. From a point of view of the structure, there is provided, as means for storing the output state of the output section 6 until the transition condition of the sequential control is satisfied, respective latch circuits 8-0, 8-1, . . . , 8-n corresponding to the outputs 50, 51, . . . , n, respectively of the output section 6, thereby supplying outputs from the latch circuits and output data from the CPU 3 each via an OR circuit to the output section 6. The CPU 3 transmits a set signal 10, a reset signal 11, and an address signal 12 as a result of an output processing of the sequential control program to these latch circuits so as to set or reset latch circuits selected by an address decoder (not shown). Output signals from the latch circuits 8-0, 8-1, . . . , 8-n are transmitted to the output section 6 via OR circuits 9-0, 9-1, . . . , 9-n in order to turn on or off the associated outputs 50, 51, . . . , n.

When the embodiment is applied to the conditional control, on the other hand, the CPU 3 transmits output data 13 and an address signal 14 as a result of an output processing of the conditional control program. The output data 13 is delivered to the output section 6 via the OR circuits 9-0, 9-1, . . . , 9-n so as to turn on or off the outputs 50, 51, . . . , n selected by an address decoder (not shown).

Figure 2:
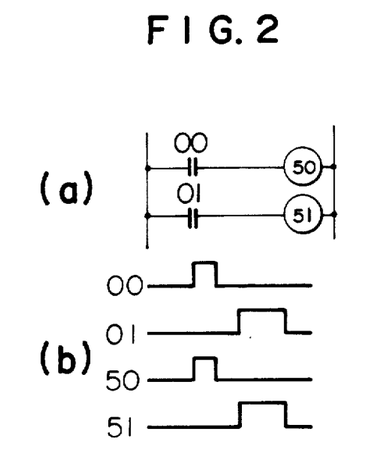
FIGS. 2(a) and 2(b) are a ladder diagram and an input/output signal timing chart, respectively, of a program example in a case where the embodiment is applied to a conditional control.
Figure 3:
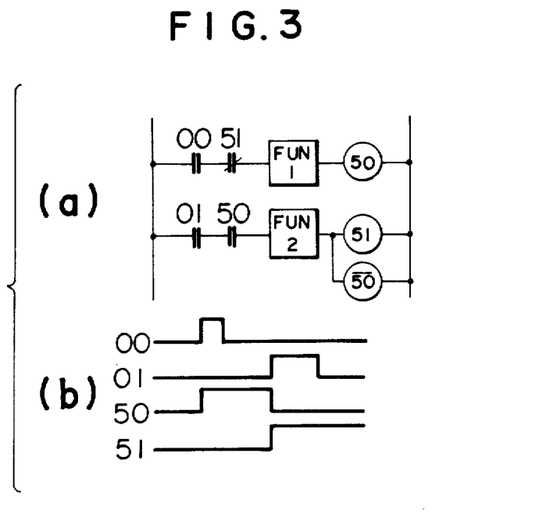
FIGS. 3(a) and 3(b) are a ladder diagram and an input/output signal timing chart, respectively, of a program example in a case where the embodiment is applied to a sequential control.

Referring now to program examples of FIGS. 2 and 3, concrete operations of the sequence controller will be described.

FIGS. 2(a) and 2(b) show an example of the conditional control in accordance with the present invention in which FIG. 2(a) is a ladder diagram illustrating a program example of the conditional control and FIG.

2(b) is a timing chart of input/output signals. When the sequence controller is operated with the program of FIG. 2(a) stored in the user RAM 4 by use of the program section 7, the CPU 3 executes the processing in the same manner as is the case of the prior art sequence controller, and turns the output 50 on if the input signal 00 is on, and turns it off if the signal 00 is off. Similarly, the CPU 3 turns the output 51 on or off as the input signal 01 is on or off.

FIGS. 3(a) and 3(b) show an example of the sequential control in accordance with the embodiment in which FIG. 3(a) is a ladder diagram of a program example of the sequential control and FIG. 3(b) is a timing chart of input/output signals. FUN 1 and FUN 2 are specific instructions (for retaining the output state) dedicated to the sequential control. Like other sequence instructions, these specific instructions are also stored in the user RAM 4 by use of the program section 7.

When executing the program of FIG. 3(a) loaded in the user RAM 4, the CPU 3 determines whether or not the transition condition is satisfied in accordance with the state of the input signal 00 when the specific instruction FUN 1 is fetched from the user RAM 4. If the input signal 00 is off, the CPU 3 does not perform any special processing, whereas if the input signal 00 is on, it outputs a set signal to the latch circuit 8-0 to set the output 50 to ON. Since the CPU does not execute processing even if the signal 00 is turned off, the latch circuit 8-0 remains in the set state so as to hold the output 50 in the ON state.

Next, when a specific instruction FUN 2 is called, the CPU 3 determines whether or not the next transition condition is satisfied in accordance with the state of the input signal 01. If the input signal 01 is on, the CPU 3 outputs a set signal and a reset signal to the latch circuits 8-1 and 8-0, respectively, which then causes the outputs 51 and 50 to be set to ON and OFF, respectively.

Figure 4:
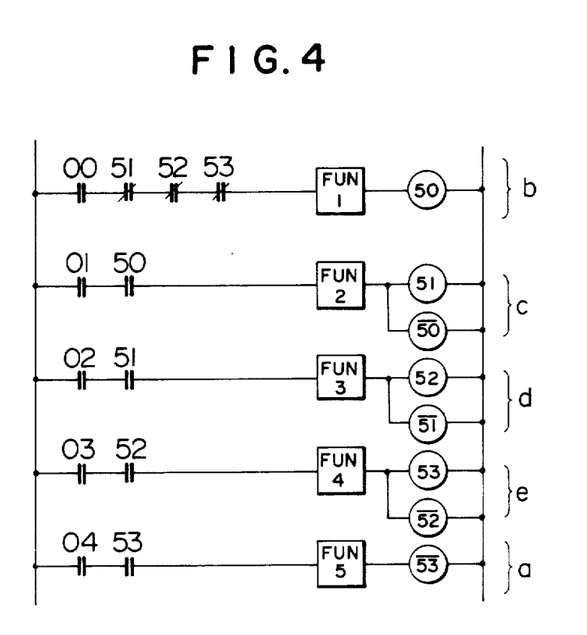
FIG. 4 is a ladder diagram depicting another program example in a case where the embodiment is applied to a sequential control.

Consequently, in order to enable the sequence controller of the present invention to execute the operation of FIG. 8, the program has only to be constructed as shown in FIG. 4, unnecessitating the operation to hold the output state by use of an internal processing, which allows the complex interlock as shown in FIG. 10 to be dispensed with.

In accordance with the embodiment, there are provided latch circuits holding the output state of the CPU so as to supply the output section with the data obtained by implementing logical OR of the outputs from the latches and the output data from the CPU, thereby enabling a sequence controller operating in accordance with the conditional control procedure to easily perform the sequential control. In addition, the interrupt processing, for example, for an emergency stop can be implemented without difficulties, which improves the safety in the operation of the sequence controller.

We claim:

1. A sequence controller, comprising:
    storage means for storing a sequence program;
    processing means connected to said storage means, for periodically processing said sequence program to provide output data;
    programming means for inputting a specific instruction dedicated to a sequential control into said storage means via said processing means;
    means connected to said processing means, for inputting external input signals into said processing means;
    output means for outputting a result processed by said processing means to an external device;
    a plurality of latch circuits respectively disposed for corresponding output terminals of said output means, each of said latch circuits having a set terminal and a reset terminal respectively connected to a set terminal and a reset terminal of said processing means;
    a plurality of logic OR circuits individually connected between said latch circuits and said output means and respectively logically ORing the output of said corresponding latch circuit and output data of said corresponding latch circuit and output data of said processing means to supply results to said output means; wherein
    said storage means for storing the sequence program is a user RAM;
    said processing means is a central processing unit; and
    each said output terminal of said output means is supplied with either output data from said processing means or output from corresponding ones of said latch circuits via said logic OR circuits.

2. A sequence controller according to claim 1 wherein:
    said processing means performs specific output processing when external input signals satisfy a logical state set by the program;
    said plurality of latch circuits retain an output state of said output means until a subsequent transition condition is satisfied, if a transition condition of the program is satisfied when the specific instruction is processed, and release the preceding output state retained before said subsequent transition condition is satisfied.

3. A sequence controller, comprising:
    storage means for storing a sequence program;
    processing means connected to said storage means for periodically processing said sequence program;
    programming means for inputting a specific instruction dedicated to a sequential control in said storage means via said processing means;
    means connected to said processing means for inputting the external input signals into said processing means;
    means for outputting to an external device a result processed by said processing means;
    a plurality of latch circuits respectively disposed for corresponding output terminals of said output means, each of said latch circuits having a set terminal and a reset terminal respectively connected to a set terminal and a reset terminal of said processing means;
    a plurality of logic OR circuits respectively disposed between said latch circuits and said output means and respectively logically ORing the output of said corresponding latch circuit and the output data of said processing means to supply the result to said output means; wherein:
    said storage means for storing a sequence program is a user RAM;
    said processing means is a central processing unit which performs specific output processing when external input signals satisfy a logical state set by the program; and
    said latch circuits, if a transition condition of the program is satisfied when said processing means processes the specific instruction, retain an output state of said output means until the next transition condition is satisfied, and release the preceeding output state retained before said next transition condition is satisfied; and each said output terminal of said output means is supplied with either output data from said processing means or output from said latch circuits via said logic OR circuits.

4. A sequence controller, comprising:

a system ROM in which a processing procedure is written;

a user RAM in which a sequence program is to be written;

a central processing unit connected to said system ROM and said user RAM for processing external input signals from an input section based on the programs written in said system ROM and said user RAM, having an output data terminal, a set signal terminal and a reset signal terminal;

a plurality of latch circuits respectively having set terminals connected to said set signal terminal of said central processing unit and reset terminals connected to said reset signal terminal of said central processing unit, said latch circuits being supplied with an address signal together with a set signal or a reset signal when said external input signals supplied to said central processing unit satisfy a logical state set by the program;

a plurality of logic OR circuits respectively having two input terminals and an output terminal, one of said input terminals being connected to an output terminal of said latch circuit corresponding thereto, and the other of said input terminals being connected to said output data terminal of said central processing unit and implementing logical OR of outputs from said latch circuits and an output from said central processing unit; and an output section having a plurality of output terminals for selectively delivering outputs from said OR circuits to said output terminals based on an address signal from said central processing unit.

5. A sequence controller according to claim 4, wherein said latch circuits, if a transition condition of the program is satisfied when said processing means processes a specific instruction, retain an output state of said output means until a subsequent transition condition is satisfied, and release a preceding output state retained before the subsequent transition condition is satisfied.

6. A sequence controller, comprising:

a system ROM in which a processing procedure is written;

a user RAM in which a sequence program is to be written;

a central processing unit connected to said system ROM and said user RAM, for processing an external input signal from an input section based on the programs written in said system ROM and said user RAM, said central processing unit having an output data terminal, a set signal terminal and a reset signal terminal;

a plurality of latch circuits respectively having set terminals connected to said set signal terminal of said central processing unit and reset terminals connected to said reset signal terminal of said central processing unit, said latch circuits being supplied with an address signal together with a set signal or a reset signal when said external input signals supplied to said central processing unit satisfy a logiocal state set by the program;

a plurality of logic OR circuits respectively having two input terminals and an output terminal, one of said input terminals being connected to an output terminal of said latch circuit corresponding thereto, and the other of said input terminals being connected to said output data terminal of said central processing unit and implementing logical OR of outputs from said latch circuits and an output from said central processing unit; and an output section being connected to said output terminals of said logic OR circuits, and having a plurality of output terminals for selectively delivering outputs from said OR circuits to said output terminals of said output section based on an address signal from said central processing unit;

wherein said latch circuits, if a transition condition of the program is satisfied when said processing means prosesses the specific instruction, retain an output state of said output means until the next transition condition is satisfied, and release the the preceding output state retained before the next transition condition is satisfied.

7. A sequential control method, comprising the steps of:

periodically calling and processing a program from a user RAM by use of a central processing unit in accordance with a processing procedure stored in a system ROM;

writing in said user RAM by use of writing means, a sequence instruction and a specific instruction for retaining an output state;

determining by said central processing unit whether a transition condition is satisfied by a state of an input signal when the specific instruction is fetched from said user RAM under the condition that the program is designed for a sequential control;

generating an address signal only when the transition condition is satisified, by use of said central processing unit, which then selects a latch circuit to supply a set signal thereto and supplies a reset signal thereto when the next transition condition is satisified;

holding the output in said selected latch circuit from when said central processing unit supplies a set signal thereto to when said central processing unit supplies a reset signal thereto;

supplying an output from said latch circuit via an OR circuit to an output section;

supplying by use of said central processing unit a result of an output processing as output data and as an address signal to said OR circuit and said output section, respectively when the program is designed for a conditional control; and supplying the output data via said OR circuit to said output circuit to select an output terminal of said output section based on the address signal.

8. A sequence controller, comprising:

storage means for storing a sequence program;

a central processing unit connected to said storage means, having an output data terminal, set signal terminal and a reset terminal, for providing output data by periodically processing external input signals on the basis of said sequence program and for executing specific output processing when said external input signals satisfy a logical state set by said sequence program;

programming means for inputting a specific instruction dedicated to sequential control into said storage means via said processing unit;

input means connected to said processing unit, for applying external input signals into said processing unit;

output means for outputting a result processed by said processing unit to an external device;

a plurality of latch circuit is respectively disposed for corresponding output terminals of said output means, each of said latch circuits having a set terminal and a reset terminal respectively connected to said set terminal and a reset terminal of said processing unit;

a plurality of logic OR circuits individually connected between said latch circuits and said output means and respectively logically responding to the output from said corresponding latch circuit and output data from said processing unit to supply results to said output means;

wherein each output terminal of said output means is supplied with either output data from said processing unit or output from corresponding ones of latch circuits via said logic OR circuits.

9. A sequence controller according to claim 8 wherein said plurality of latch circuits retain an output state of said output means until a subsequent transition condition is satisfied, if a transition condition of the program is satisfied when the speicific instruction is processed, and release the preceding output state retained when said subsequent transition condition is satisfied.

10. A sequence controller according to claim 8, wherein said latch circuits, if a transition condition of the program is satisfied when said processing unit processes a specific instruction, retain an output state of said output means until another transition condition is satisified, and release a preceding output state retained when another transition condition is satisfied.

11. A sequence controller, comprising:

storage means for storing a sequence program;

a central processing unit connected to said storage means, having an output data terminal, a set signal terminal and a reset terminal, for providing output data by periodically processing external input signals on the basis of said sequence program, for executing specific output processing when said external input signals satisfy a logical state set by said sequence program, for providing first address signals as a result of output processing in a first kind of instruction processing program and for providing set signals via said set signal terminal, reset signals via said reset signal terminal and second address signals as a result of output processing in a second kind of instruction processing program;

programming means for inputting specific instructions dedicated to controlling the kind of said instruction processing performed for said process into said storage means via said processing unit;

input means connected to said processing unit, for applying external input signals into said processing unit;

output means for receiving said first address signals as said results of output processing said first instruction processing program and for outputting a result processed by said processing unit to an external device;

a plurality of latch circuits respectively disposed for corresponding output terminals of said output means, each of said latch circuits having a set terminal and a reset terminal respectively connected to said set terminal and a reset terminal of said processing unit, and receiving said set signals, reset signals and second address signals as said result of output processing of said second instruction processing program;

a plurality of logic OR circuits individually connected between said latch circuits and said output means and respectively logically responding to the output from said corresponding latch circuit and output data from said processing unit to supply results to said output means;

wherein each output terminal of said output means is supplied with output data from said procesing unit when said processing unit executes output processing pursuant to said first kind of instruction processing, and output from corresponding ones of latch circuits via said logic OR circuits when said processing unit executes specific output processing pursuant to said second kind of instruction processing.

12. A sequence controller according to claim 11 wherein during said second kind of instruction processing, said plurality of latch circuits retain an output state of said output means until a subsequent transition condition is satisfied if a transition condition of the program is satisified when the specific instruction is processed, and release the preceding output state retained when said subsequent transition condition is satisified.

13. A sequence controller according to claim 11, wherein during said second kind of instruction processing, said latch circuits, if a transition condition of the program is satisfied when said processing unit processes a specific instruction, retain an output state of said output means until another transition condition in satisified, and release a preceding output state retained when another transition condition is satisfied.

* * * * *